United States Patent Office 3,405,906
Patented Oct. 15, 1968

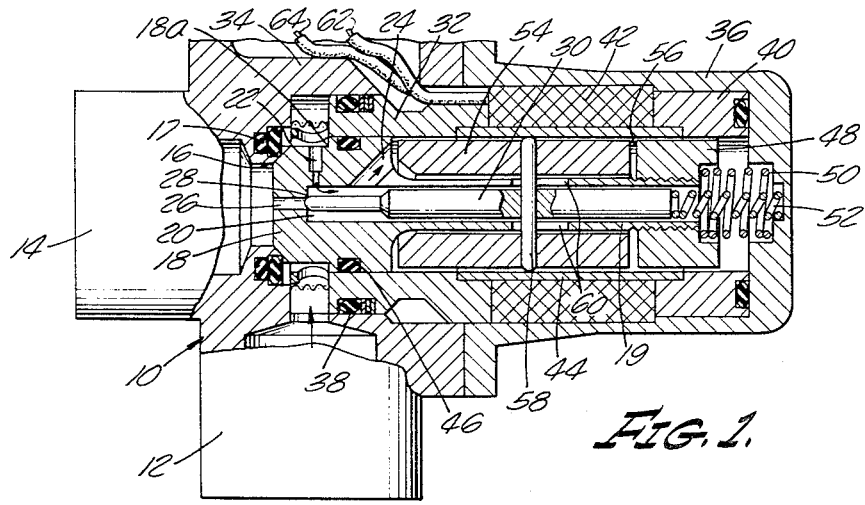

3,405,906
SOLENOID PILOT OPERATED VALVE
William F. Keller, Covina, Calif., assignor to International Telephone and Telegraph Corporation, a corporation of Delaware
Filed Aug. 4, 1966, Ser. No. 570,365
1 Claim. (Cl. 251—30)

ABSTRACT OF THE DISCLOSURE

A solenoid controlled pilot operated valve in which a single low-power solenoid has a structure defining a first magnetic path for opening the pilot valve and a second magnetic path for holding the main valve in its open position after the main valve is opened by line pressure.

---

This invention relates to a solenoid controlled pilot operated valve and more particularly to an improved low-cost valve of this type suitable for controlling high pressure fluid flow.

For purposes of this application, a pilot-operated valve is understood to mean one in which line pressure of the fluid being controlled is employed to hold a main valve in its closed position, and a pilot valve is employed to bleed the pressure holding the main valve closed to the outlet side of the main valve so that when the pilot valve is opened, line pressure no longer holds the main valve closed. Consequently, the main valve may then be opened with less force than required if line pressure were still holding the main valve closed.

In one type of such pilot operated valve a solenoid construction is used to open the pilot valve, then assist in opening the main valve and hold the main valve in the open position. One shortcoming of such approach is that in high pressure fluid situations of 1500 p.s.i. and up, a rather high wattage solenoid is required to open the pilot valve in that the force required by the solenoid armature must be produced across the air gap determined by the sum of the distance the pilot and main valve elements move from their shut to open positions.

In another prior art approach, a smaller solenoid may be employed to open the pilot valve in that line pressure is utilized to open the main valve and hold the main valve in its open position. The difficulty with this arrangement is that a pressure drop across the valve is required to hold the valve open. Thus, variations or fluctuations in the inlet pressure or a high outlet pressure may cause the main valve to open and close or cause the valve to perform a regulating function.

It is a primary object of this invention to obviate the foregoing difficulties by providing a unique solenoid controlled pilot operated valve wherein a low power solenoid is employed to open the pilot valve and to maintain the main valve in the open position after the main valve is opened by line pressure.

It is a further object of this invention to provide a solenoid controlled pilot operated valve in which the low power solenoid has structure defining a first magnetic path for opening the pilot valve and a second magnetic path for holding the main valve in its open position after the main valve is opened by line pressure.

Yet another object of the invention is to provide a solenoid controlled pilot operated valve wherein a single solenoid coil is employed to control the position of both a pilot armature and a main valve armature which are mounted to be moved as a unit and also mounted to permit limited movement of the pilot valve armature relative to the main valve armature.

In accordance with this invention the valve construction includes a valve body having a fluid inlet and a fluid outlet with a main valve seat, a main valve element, and a pilot valve chamber positioned between the inlet and the outlet. A pilot valve seat and valve element connect the pilot chamber to the outlet while a continuously open restricted passage connects the inlet to the pilot chamber. The pilot valve has a capacity considerably greater than the restricted passage so that line pressure entering the pilot chamber which holds the main valve closed can be bled from the pilot chamber and hence the main valve readily opened. The valve is also constructed such that line pressure will open the main valve once the pilot chamber has been bled to the valve outlet.

A main armature is attached to the main valve element and a pilot armature is attached to the pilot valve element and mounted for movement towards said main armature to open the pilot valve. The pilot armature is also movable with the main armature. A spring urges the pilot valve element into engagement with the pilot valve seat and urges the pilot armature away from the main armature. A small, low wattage solenoid coil is positioned in flux linking relation with the armatures, and magnetic structure adjacent the coil provides a magnetic path with the armature for the flux produced by the coil. This magnetic structure uniquely includes a first portion closely adjacent the main armature so that the coil will have sufficient power to complete a magnetic circuit through the armatures and such portion of the magnetic structure to cause the pilot armature to move relative to the main armature to open the pilot valve. This action permits the fluid pressure existing in the pilot chamber to be bled to the outlet so that fluid pressure in the inlet opens the main valve, and thus moves the main armature into a valve open position. The magnetic structure further includes a second portion spaced from the main armature when the main armature is in a valve closed position but located near the main armature when the main valve is moved to its open position by fluid pressure. Consequently, the second portion completes a flux path with characteristics such that the coil has sufficient power to hold the main armature and the main valve in the valve open position although the coil does not have sufficient power to move the main valve into the valve open position in that it cannot bridge the gap between the main armature and the second portion of the magnetic structure which exists when the main valve is closed. With such an arrangement, the desired control can be maintained over the position of the pilot valve and the main valve with a low cost, low power solenoid.

Further features, objects and advantages of the invention will become apparent with reference to the following description and drawing in which:

FIG. 1 is a cross sectional view of the valve construction of the invention with the main valve and the pilot valve in the closed position;

FIG. 2 shows the valve of FIG. 1 with the pilot valve in its open position;

FIG. 3 shows the valve of FIG. 1 with both the main valve and the pilot valve in the open position.

Referring now to the drawing, the valve construction of the invention may be seen to include a valve body 10 having an inlet 12, an outlet 14, and a main valve seat 16 which may include suitable sealing elements 17. A slidably mounted main valve element 18 controls the flow of fluid between the inlet and the outlet in cooperation with the main valve seat 16. Within the main valve element 18 there is formed a pilot valve chamber 20 which is in limited fluid communication with the inlet 12 through continuously open, restricted passage 22 extending radially through the main valve element. Note that the pilot chamber 20 is also in open fluid communication through passage 24 with the backside of main valve element 18. A passage 26 formed in the end of the main valve element 18 connects the pilot chamber 20 to the outlet 14 and one end of the passage forms a pilot valve seat 28 which cooperates with an elongated rod-like pilot valve element 30 mounted within the main valve element 18.

The valve elements are controlled by and integrated with a solenoid or electromagnetic structure including a ring or generally cylindrical member 32 made of iron or similar magnetic material and positioned within a cylindrical section 34 of the valve body. Member 32 extends outwardly through an opening in the valve body and is received within a cup-shaped cover or casing 36 made of magnetic material and which cooperates with the valve body to contain the remainder of the solenoid components. Suitable sealing means 38 are positioned between ring member 32 and valve body portion 34 to prevent leakage out of the valve body.

The solenoid structure further includes a second iron ring or cylindrical member 40 sealed against the end of casing 36 and separated from the ring 32 by a coil 42. A non-magnetic cylindrical tube 44 is shown positioned immediately within coil 42 with one end of the tube secured within a suitable recess in ring 32 and the other end of the cylinder secured within a similar recess in ring 40.

The main valve element 18 is slidably mounted within member 32 and carries a suitable O ring 46 for preventing fluid flow to the pilot chamber 20 from the inlet 12 except through restricted passage 22. The main valve element 18 includes an elongated tubular portion 19 having threaded to its outer end a main armature 48 adjacent the outer end of tube 44 and ring 40. Extending between the outer end of armature 48 and the closed end of cup-shaped casing 36 is a coil spring 50 urging the main armature and main valve toward the main valve seat 16. Also, a smaller coil spring 52 positioned within spring 50 and extending between casing 36 and the outer end of pilot valve element 30 urges the pilot valve element against the pilot valve seat 28.

Between the tubular portion 19 of the main valve element and the surrounding coil 42 and ring 32 there is defined an annular space in which is positioned a tubular pilot armature 54. The axial length of the pilot armature 54 is such that a limited amount of movement between the pilot armature and the main armature 48 is permitted causing, as seen in FIG. 1, a gap 56 between the two armatures when both the main valve and the pilot valve are in their closed positions. In practice this gap is quite small and is even exaggerated somewhat in the drawing.

A connecting pin 58 extends transversely through pilot armature 54 and pilot valve element 30 so that the pilot armature and element move as a single unit. A pair of slots 60 formed in the tubular portion 19 of the main valve element permit movement of the pilot armature and pilot valve element independently of the main valve element.

In FIG. 1, coil 42 is unenergized and both the main valve and the pilot valve are shown in their closed positions as urged by the springs 50 and 52. Also, fluid inlet pressure entering pilot chamber 20 through restricted passage 22, as indicated by the small arrows, is transmitted through passage 24 to the backside of the main valve 18. Consequently, fluid inlet pressure acting against the backside of the main valve holds the main valve in its closed position. Similarly, inlet pressure holds the pilot valve element closed. It should be noted that an annular shoulder 18a is also subjected to fluid inlet pressure and is located such that the force on the shoulder tends to open the main valve. However, the area of this shoulder is considerably smaller than the area of the backside of the valve also exposed to fluid inlet pressure, with the result that the main valve is positively held in closed position by fluid pressure when the pilot valve is closed.

To operate the valve, coil 42 is energized by means of conductors 62 and 64 leading to a suitable source of power. Energization of coil 42 induces magnetic flux lines through ring 32, pilot armature 54, main armature 48 and ring 40 and the annular sidewall portion of casing 36. The power provided by coil 42 is sufficient to induce an axial force adequate to bridge the gap 56 between the pilot armature 54 and the main armature 48, thus moving the pilot armature and the connected pilot valve elements against inlet pressure and spring 52 into engagement with the main armature. Note that slots 60 permit such movement. Naturally the power provided by the coil is such that it can bridge the slight clearance spaces between pilot armature 54 and iron ring 32 and between main armature 48 and iron ring 40. However, in accordance with the invention, the power provided by the coil is not adequate to bridge the gap between the main armature 48 and the closed outer end of casing 36 to produce a force adequate to move the main valve against inlet pressure.

Opening the pilot valve 30 bleeds the pressure from pilot chamber 20 since the pilot valve has a flow capacity several times greater than the restricted inlet passage 22. Therefore, the pressure in chamber 20 approaches outlet pressure and line inlet pressure no longer acts against the backside of the main valve to hold the main valve in its closed position. Instead, fluid inlet pressure acting against shoulder 18a urges the main valve into its open position away from valve seat 16 and against the main valve spring 50. Upon opening the main valve, the main armature is, in accordance with the main invention, placed into contact with the closed outer end of casing 36, as shown in FIG. 3. As a result, the magnetic path through the solenoid structure has now changed. The circuit at this stage is through ring 32, pilot armature 54, main armature 48 and casing 36. Ring 40 being slightly spaced from the main armature is essentially bypassed. In this position, the power of coil 42 is adequate to hold the main valve armature 48 in the valve open position against the force of spring 50.

With such arrangement, changes in pressure across the valve do not affect the position of the main valve. Hence, if pressure across the main valve decreases to the point where it is less than the force of spring 50, the main valve is not closed by main spring 50 in that the solenoid structure holds the valve in the open position. Upon de-energization of the solenoid coil 42, the pilot valve armature and the pilot valve are urged into the closed position by the pilot spring 52, with the result that fluid inlet pressure is once more allowed to accumulate in the pilot valve chamber and act against the backside of the main valve element to urge the element closed together with spring 50. In the absence of pressure, the main valve spring 50 urges the main valve armature and the main valve element into the closed position.

Thus it can be seen that a unique, low power solenoid construction has been disclosed for operating a pilot type valve construction so that the pilot valve may be positively opened and the main valve held open by the solenoid. While only a single embodiment of the invention has been illustrated and described it should be understood that various modifications will readily come to mind in the light of the disclosure. It is intended that all such modifications, or variations be included in the appended claim.

What is claimed is:

1. In a valve construction having a valve body with a fluid inlet, a fluid outlet, a main valve seat, a pilot valve chamber, a main valve element seatable on said main seat, means forming a pilot valve seat connecting said pilot chamber to said outlet, a pilot valve element seatable on said pilot valve seat, means defining a restricted passage connecting said inlet to said pilot chamber, said passage having smaller flow capacity than said pilot valve seat, said main valve element having a first surface area in open communication with said pilot chamber so that said main valve is held by fluid pressure in its closed position when the pilot valve is closed, said main valve having a surface area smaller than said first area exposed to said inlet pressure when said main valve element is moved by inlet pressure away from said main valve seat when said pilot valve is opened, said pilot valve element being urged against its seat by pressure in said chamber, unique electromagnetic means for controlling the operation of said valve comprising:

a main armature attached to said main valve element, being movable with said main valve element between valve open and valve closed positions;

a pilot armature attached to said pilot valve element and mounted for movement towards said main armature to open said pilot valve and being movable with said main armature;

a spring urging said pilot valve element into engagement with said pilot valve seat and urging said pilot armature away from said main armature;

coil means positioned in flux linking relation with said armatures;

magnetic structure positioned adjacent said coil means and said armatures for providing a magnetic path for flux produced by said coil means and including a first portion slightly spaced from said main armature, said coil means having sufficient power to complete a flux path through said armatures and said first portion to cause said pilot armature and said pilot valve to move towards said main armature against fluid pressure urging the pilot valve closed to open said pilot valve and bleed pressure from said pilot chamber, whereby fluid pressure existing in said inlet opens said main valve and thus moves said main armature into said valve open position;

said magnetic structure including a second portion spaced from said main armature when the main armature is in said valve closed position, said main armature being movable closer to said second portion when said main valve is moved to its open position by fluid pressure, whereby said second portion completes a flux path having characteristics such that said coil means has sufficient power to hold said main armature and main valve in said valve open position;

said pilot chamber and said pilot valve seat being formed within the interior of said main valve element, said main valve element including a tubular portion connected at one end to said main armature and said pilot valve element being slidably mounted within the tubular portion of said main valve element; and said pilot armature having a tubular shape and being slidably mounted on said tubular portion of said main valve element, said tubular portion of said main valve element being formed with an axially extending slot on opposite sides of said pilot valve element, and a pin extending through said pilot armature and said pilot valve element and said slots whereby said pilot valve element is movable with said pilot armature and said slots permit relative movement of the pilot valve element and the pilot armature with respect to the main valve element and the main armature.

References Cited
UNITED STATES PATENTS

| | | | |
|---|---|---|---|
| 2,969,088 | 1/1961 | Kramer | 251—30 |
| 3,100,103 | 8/1963 | Bullard | 251—30 |
| 3,114,532 | 12/1963 | Gray et al. | 251—38 X |

FOREIGN PATENTS

| | | |
|---|---|---|
| 1,280,661 | 11/1961 | France. |

ARNOLD ROSENTHAL, *Primary Examiner.*